United States Patent
Eshghi et al.

(10) Patent No.: US 7,668,852 B2
(45) Date of Patent: Feb. 23, 2010

(54) METHOD FOR CREATING SKETCHES OF SETS TO PERMIT COMPARISON

(75) Inventors: Kave Eshghi, Palo Alto, CA (US); Hsiu Khuern Tang, Palo Alto, CA (US); Henri Jacques Suermondt, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 11/591,128

(22) Filed: Oct. 31, 2006

(65) Prior Publication Data

US 2008/0104078 A1 May 1, 2008

(51) Int. Cl.
*G06F 7/00* (2006.01)
(52) U.S. Cl. .................... 707/101; 707/104.1; 707/9; 713/150
(58) Field of Classification Search .................. None
See application file for complete search history.

(56) References Cited

U.S. PATENT DOCUMENTS

| 6,470,329 B1 * | 10/2002 | Livschitz ................. 707/1 |
| 6,839,714 B2 | 1/2005 | Wheeler et al. |
| 2003/0081770 A1 * | 5/2003 | Futa et al. ................. 380/28 |
| 2006/0193490 A1 * | 8/2006 | Srinivasan et al. .......... 382/100 |

FOREIGN PATENT DOCUMENTS

WO    WO 2005043808    *    4/2005

\* cited by examiner

*Primary Examiner*—John E Breene
*Assistant Examiner*—Thu-Nguyet Le

(57) ABSTRACT

Provided is a method for creating sketches of sets to permit comparing set members selected from a universe. The method includes selecting a size for the sketch and providing a randomizer. In addition, a set is provided as a subset of the universe. The set is processed with the randomizer to provide a new vector. The new vector is normalized to provide a value. Dividing each element of the new vector by the determined value results in the sketch.

23 Claims, 5 Drawing Sheets

Party I

Party II

Party III

FIG. 4

Random Matrix (RM)

Size of Universe l = 26
Size of Sketch k = 12

U = a b c d e f g h i j k l m n o p q r s t u v w x y z
S = a         e f g h i j k l m n     p q
C = 1 0 0 0 1 1 1 1 1 1 1 1 1 1 0 1 1 0 0 0 0 0 0 0 0 0

S' =   e f g h i j k l m
C' = 0 0 0 1 1 1 1 1 1 1 1 1 1 0 0 0 0 0 0 0 0 0 0 0 0 0

S'' =                             p                   w   y z
C'' = 0 0 0 0 0 0 0 0 0 0 0 0 0 0 1 1 1 1 1 1 0 1 1 1

RM × C = P  = -2, -2, 0, 0, 2, 0, -2, -4, -2, 0, 2, 0, -4, -2, 0, 2, -2, 0, 2, -2, 0, 2, -2, 0, 2, -6
RM × C' = P' = -3, -1, -1, -1, -1, -1, -1, -3, -3, 3, 3, -9
RM × C'' = P'' = -3, -1, -3, -1, -1, -5, -5, -1, -7, -9, -1 s = 9.79796
N = P/s = {-0.204, -0.204, 0, 0, 0.204, -0.204, -0.408, -0.204, 0, 0.204, -0.204, -0.612} s' = 11.4891
N' = {-0.261, 0.0870, -0.0870, -0.0870, -0.0870, -0.0870, -0.261, -0.261, 0.261, 0.261, -0.261, -0.783} s'' = 14.2829
N'' = {-0.210, -0.070, -0.210, 0.070, -0.070, -0.070, -0.350, -0.350, -0.070, -0.490, -0.630, -0.070}

METHOD FOR CREATING SKETCHES OF SETS TO PERMIT COMPARISON

FIELD OF THE INVENTION

The present invention relates generally to the comparison of data and more specifically to a method of evaluating a comparison of data sets without divulging the actual information present in either set.

BACKGROUND

Record information data is increasingly important in the modern world. With the advent of computer technology the ability for individuals and entities to store and retrieve data has become increasingly more commonplace. Often this storage involves the use of databases which may be quite large.

Especially in the area of commerce, record data such as customer information is often highly guarded. Indeed companies exist for the sole propose of mining customer data and developing lists of individuals that are tailored for specific product or service offerings. This data and its organization may actually be a trade secret that, if revealed, would weaken a company's competitive edge.

For example, in a Universe of people defined as the United States, a company may have compiled detailed information records regarding past products purchased. Likewise another company may have compiled detailed information records regarding past travel patterns.

As important to each company's business as it is to keep these records secret, there may well be marketing opportunities that would benefit both companies if overlaps in the record sets were known.

As different companies may well use different databases, a direct comparison of the data may not be an easy task, requiring data reformat and possible migration from one platform to another. In addition, in some comparison scenarios it may be possible to determine the other party's data by systematic testing. The value of the data and the risk of exposure or exploitation may be viewed as so great and potentially so damaging that attempting a comparison is not viewed as viable.

In another setting there may be issues regarding personal privacy, yet a very real need to compare and identify individuals and/or information. Likewise, there are often needs to compare private documents, but not inadvertently reveal the contents of the documents.

To some extent, neutral third parties may be engaged to perform the comparison such that neither of the data-holding parties has an opportunity for first-hand review. As effective as such an exercise may be, the neutral third party does, of course, have access to both sets of data and must be well trusted. In some instances it may be effective to use unique values, such as hash values, to confirm perfect matches between data; however; as the change of one element will result in an entirely different hash, such a comparison is truly only practical for perfect match situations.

In certain instances, hash values may also be used to confirm the presence of one or more members within a set. However, in such an instance, if the members of the universe are known, it is possible to systematically test to see if each of these members is in the target set. In so doing the anonymity of the set members is lost.

Hence, there is a need for a method to permit the comparison of set members where the sets are not necessarily identical and where the members of the sets are not openly compared so as to overcome one or more of the drawbacks identified above.

BRIEF DESCRIPTION OF THE DRAWINGS

FIG. 4 illustrates a random matrix, characteristic vectors and resulting sketches in accordance with an embodiment.

DETAILED DESCRIPTION

Before proceeding with the detailed description, it is to be appreciated that the present teaching is by way of example only, not by limitation. The concepts herein are not limited to use or application with a specific system or method for creating sketches of sets to permit comparison of members. Thus, although the instrumentalities described herein are for the convenience of explanation, shown and described with respect to exemplary embodiments, it will be appreciated that the principles herein may be applied equally in other types of systems and methods involving the creation of sketches to permit statistical comparison of set members.

The present disclosure advances the art by providing, in at least one embodiment, a method for creating sketches of sets to permit comparing of set members selected from a universe.

Figure 1:
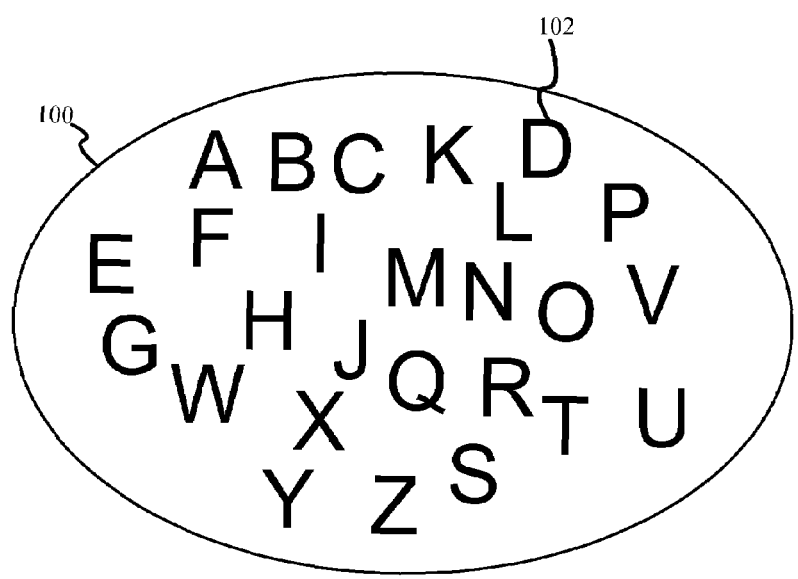
FIG. 1 is a conceptual view of a universe and subsets of elements drawn from the universe, in accordance with an embodiment.
Figure 1:
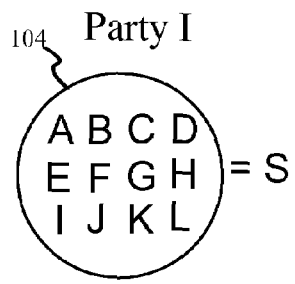
Figure 1:
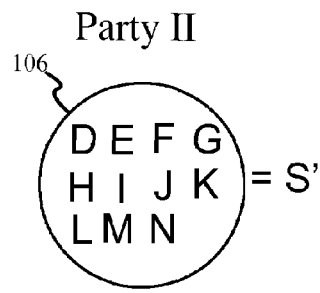
Figure 1:
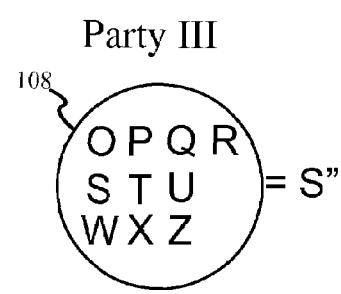

FIG. 1 presents a conceptual view of a universe U. The universe may be that of the people within a country and their associated data points such as name, age, sex, social security number, phone; address, favorite color, etc. . . . . More specifically, the universe is understood and appreciated to be a defined set of elements. Each element may be a singular element, or it may be a complex element, such as the example of a person and his or her associated characteristics.

For the sake of example only, the universe 100 is that of the English alphabet. The members 102 of the universe are the letters (A B C D E F G H I J K L M N O P Q R S T U V W X Y Z) and the size of the universe is twenty-six. Continuing with this example, there are three parties I, II and III, each of which has a set of members selected from the universe. Party I has set 104 having twelve elements (A B C D E F G H I J K L) and Party II has a set 106 having eleven elements (D E F G H I J K L M N) Party III has a set 108 having eleven elements (O P Q R S T U W X Y Z).

Clearly, there are shared members between sets 104 and 106; however there are no shared members between set 108 and either set 104 or set 106. Assuming, for the moment, that the letters represent customers, then assessing a business opportunity based on customer overlap requires an assessment of similarity between sets 104, 106 and 108. In a setting where each party desires, if not requires, that the elements of his or her set be maintained in secret, an embodiment of the statistical method for creating sketches to compare these sets is advantageously desirable.

With respect to the examples of sets 104, 106 and 108, the similarity between any two sets (S and S') may be defined by the following equation:

$$sim(S, S') = \frac{|S \cap S'|}{\sqrt{|S| \cdot |S'|}}$$

This equation provides a natural measure of similarity, wherein the result is "1" when the two sets are identical and "0" where they are disjoint. Moreover, where S and S' are example sets 104, 106 the result will be close to "1", whereas if S or S' is replaced by set 108, the result will be "0". Moreover, it is understood and appreciated that the issue one of degree as the measure of similarity will be a value generally between 1 and 0, and not the binary occurrence of either a 1 or a 0 indicating a simple "same" or "not same" determination. It is the advantageous ability to determine the degree of similarity for the aggregate sets that is important, and that this degree of similarity is determined without exchanging or divulging the members of each set. Of course, to process the above equation, the elements of S and S' must be known. As is further demonstrated below, an embodiment of the statistical method for comparison approximates the result of this equation without divulging the true members of any set.

Figure 2:
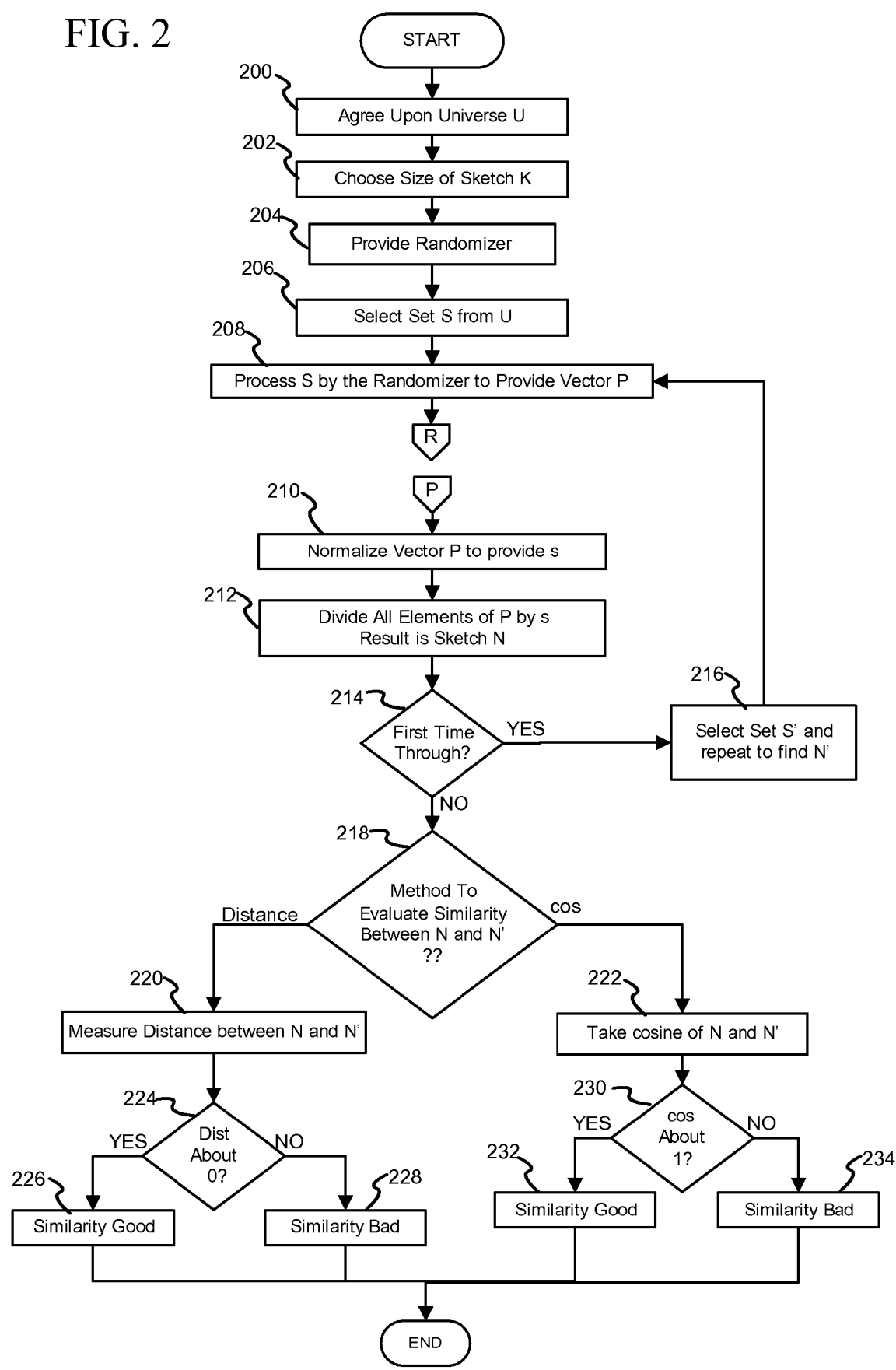
FIG. 2 is a flow diagram of sketch generation and comparison in accordance with an embodiment.

FIG. 2 provides a flow diagram in accordance with at least one embodiment of a method for creating sketches of sets to permit comparing set members selected from a universe. It will be appreciated that the described method need not be performed in the order in which it is herein described, but that this description is merely exemplary of one statistical method of creating sketches of sets to permit comparing set members.

In at least one embodiment, the statistical method for creating sketches of sets to permit comparing set members selected from a universe U with size w consists of the following. Selecting a size k for a sketch N, providing a randomizer; providing a set S as a subset of universe U; processing the set S by the randomizer to provide vector P; normalizing vector P to provide s; and determining sketch N by dividing each element of P by s. When the method is performed for set S and set S' the resulting sketches N and N' may be compared to determine statistical similarity.

In at least one embodiment, the randomizer is a random matrix. Where the size of the universe is manageable, the use of a random matrix is well suited. However, situations may arise where the universe is so expansive that the use of a random matrix is technically cumbersome. In at least one embodiment for such a setting, the randomizer is a set of hash functions.

As shown, generally the method commences with an agreement upon the universe U, as shown in block 200. In agreeing upon the universe U, the size w of U is also provided. Whereas the example universe shown in FIG. 1 consisting of the English alphabet is helpful for ease of discussion and illustration, it is to be understood that generally a universe will order on the magnitude of hundreds, if not hundreds of thousands or larger, collections of elements.

The next action is to agree upon the size of the representative sketch, i.e. size=k, block 202. With respect to the term "sketch" it is understood and appreciated that a sketch is representation of the data structure, or more specifically, it is a representation of the data set. The use of sketches is advantageous for, in many instances, the sets desired for comparison may be quite large and difficult to manipulate. The selection of size k for each sketch is therefore advantageous in simplifying the task of statistical comparison.

So as to maintain the anonymity of the elements within each data set, a randomizer is provided, block 204. As is further described below, in at least one embodiment the randomizer is a random matrix of size w (the size of the universe) by k (the size of the sketch). In at least one alternative embodiment the randomizer is a set of hash functions, $h_1, \ldots h_k$.

To generate a sketch N for set S, S is provided as a subset of U, block 206. While it may seem obvious that S is and should be a subset of U, it is nonetheless stated this way to ensure that errant data elements are not inadvertently included in set S, an event that would likely corrupt the comparison process and diminish the advantageous statistical results.

The set S is then processed by the randomizer to provide vector P. As stated above, there are at least two choices of randomizers, block 300, FIG. 3. In at least one embodiment, the randomizer is a random matrix, block 302. With respect to the use of a random matrix, in at least one embodiment it is understood and appreciated to be a matrix of repeated instantiations of a random variable with an expected value of zero. This is to say, for example, that in at least one embodiment the elements of the random matrix will randomly be either "1" or "−1". In at least one alternative embodiment, the elements of the random matrix will randomly be either "2" or "−2". Other numeric values may also be used.

Every element within the universe U may be assigned a unique number, such as the alphabetical position of the letters of the alphabet in universe 100 shown in FIG. 1. Specifically, we assume that there is a one-to-one mapping of the objects in the universe to integers between 1 and w, which is referred to as mapping m. Thus for an object a in U, m(a) is a number between 1 and w, and for two different objects a and b in U, m(a) is different from m(b). For example, the mapping m may refer to the alphabetical position of the letter in the English alphabet in universe 100 shown in FIG. 1, where m('a')=1, m('b')=2 etc.

A characteristic vector C is then generated of size w for set S, block 304. A characteristic vector is understood and appreciated to be a vector representation of the set with respect to the universe U. For each set generated as a subset of the universe, a comparison is made between the members of the set and the universe itself. For each element x in U, a "1" or a "0" is entered in the position m(x) in the characteristic vector, depending on whether or not x is present within the set S. For example, with respect to set 104, the characteristic vector would be as follows:

U=(A B C D E F G H I J K L M N O P Q R S T U V W X Y Z)

S=(A B C D E F G H I J K L)

C=(1,1,1,1,1,1,1,1,1,1,1,1,0,0,0,0,0,0,0,0,0,0,0,0,0,0)

Similarly, with respect to set 106, the characteristic vector would be as follows:

U=(A B C D E F G H I J K L M N O P Q R S T U V W X Y Z)

S'=(D E F G H I J K L M N)

C'=(0,0,0,1,1,1,1,1,1,1,1,1,1,0,0,0,0,0,0,0,0,0,0,0,0,0)

And, lastly, with respect to set 108, the characteristic vector would be:

U=(A B C D E F G H I J K L M N O P Q R S T U V W X Y Z)

S''=(O P Q R S T U W X Y Z)

C''=(0,0,0,0,0,0,0,0,0,0,0,0,0,0,1,1,1,1,1,1,1,0,1,1,1,1)

With respect to the above characteristic vectors, it is clear that each is a representation of the data contained in each corresponding set. It is also clear that with knowledge of the universe and how the unique ordering has been set, it is possible to infer the members of a set by reviewing the corresponding characteristic vector.

So as to provide anonymity to the set members, the characteristic vector is processed with the randomizer, block 306. For the present example, the randomizer is a random matrix (RM) 400, see FIG. 4. As the random matrix is size w by k and the characteristic vector is size w, the resulting vector P from multiplication with the random matrix will now be size k.

With respect to FIG. 4, the calculation of P is shown as:

$$RM \times C = P = (-2, -2, 0, -2, -2, -4, -4, -2, 0, 2, -2, -6)$$

Figure 3:
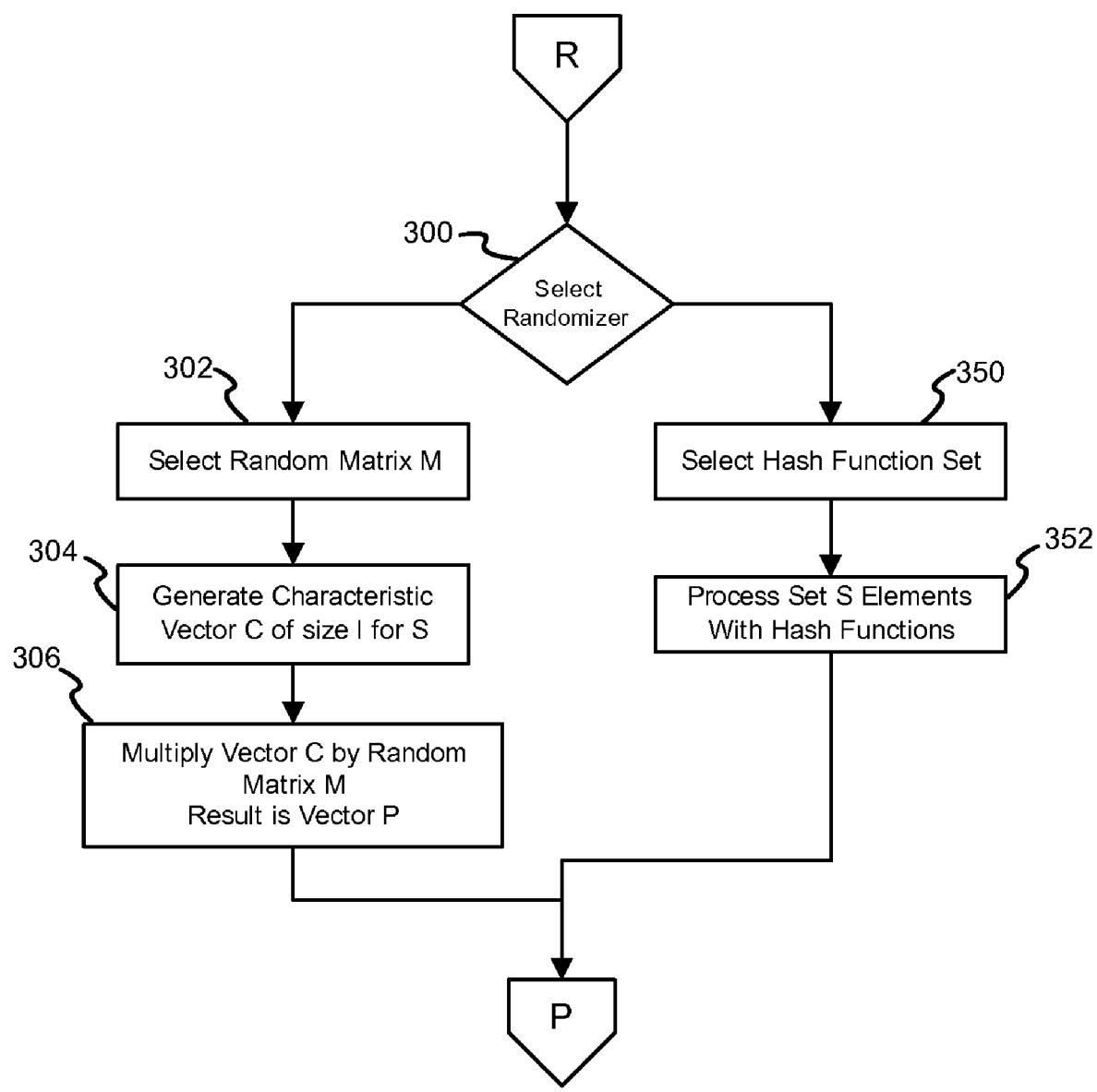
FIG. 3 is a flow diagram illustrating the randomizer alternatives of at least a random matrix or a set of hash functions.
Figure 5:
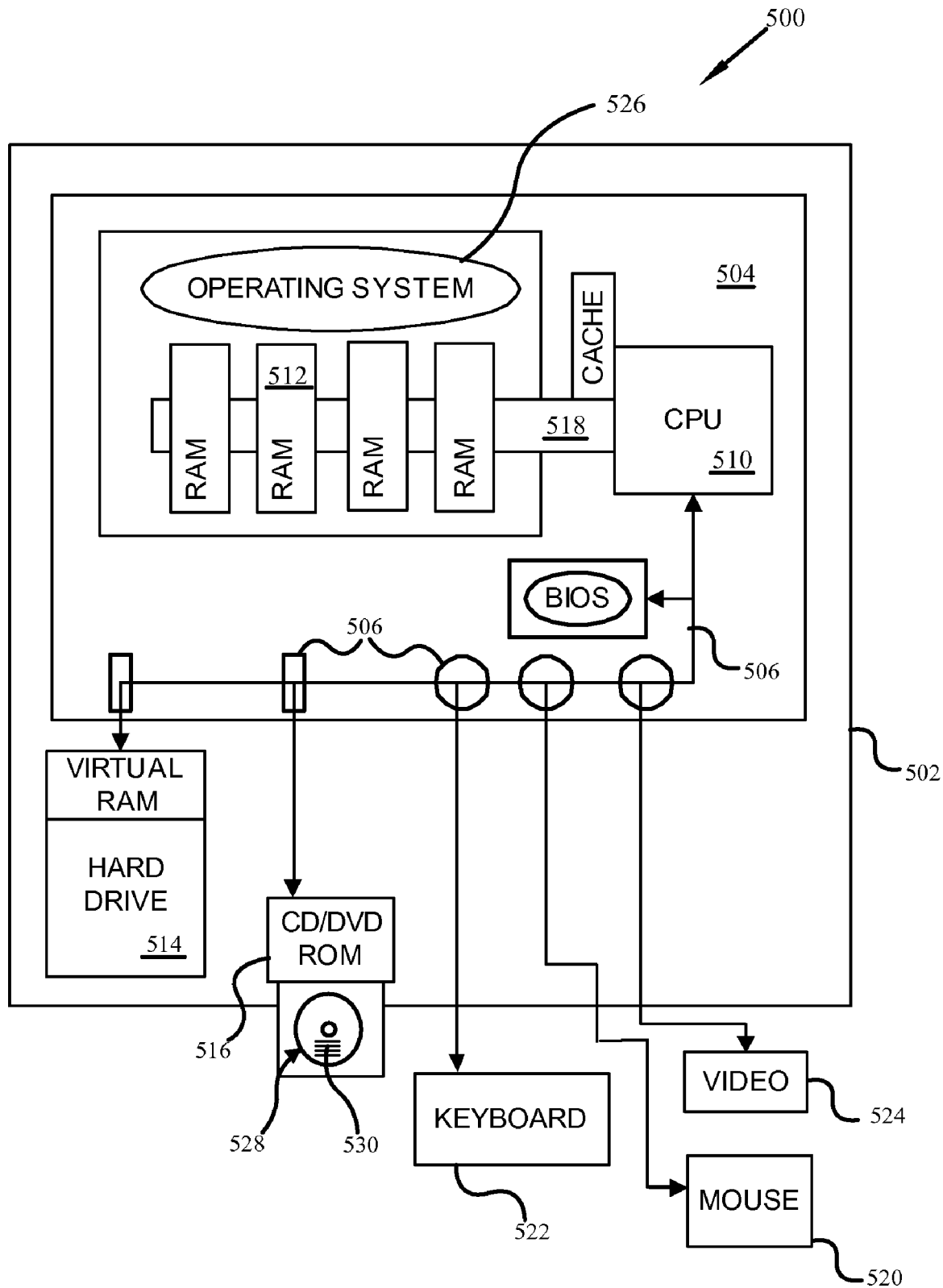
FIG. 5 is a block diagram of a computer system in accordance with one or more embodiments.

Several advantages of P may be observed. Vector P is a smaller than vector C and, as such, may be easier to manipulate and further process. Specifically vector $P=[p_1, p_2, \ldots p_k]$, which in the example of FIG. 3, is a twelve element vector. In addition, even with the direct knowledge of the random elements within random matrix 400 the true elements of the corresponding set are not known.

It is noted that, when the universe is extremely large, the use of a random matrix may be computationally difficult and impractical to generate and store. As such, in at least one embodiment a set of hash functions is selected to simulate a random matrix, decision 300 and block 350, see FIG. 3. To achieve this, in at least one embodiment, k functions ($h_1$, $h_2$, ... $h_k$) are randomly selected from a family H of hash functions that map integers into the set $\{+1, -1\}$. Although a characteristic vector may be used, it is not a necessary requirement for processing with the hash functions. In practice, where a hash function is chosen over the use of a random matrix, the generation of the characteristic vector may be an undesirable task.

Rather, each element of vector P may be generated by processing the hash function against the element value for each member of the set S, block 352. Moreover, each element of the set has an ordered value of 1 to w to which the element can be mapped, defined above as the mapping m. So, to calculate the value of $p_i$ the hash function $h_i$ is applied and the results are added up collectively. More specifically, the elements of vector P are calculated as:

$$p_i = \sum_{x \in S} h_i(m(x))$$

Whether a random matrix is used or a set of hash functions, the resulting vector P has substantially the same statistical properties and the form of generation does not substantially alter the eventual statistical calculation of similarity.

For practical use, in at least one embodiment vector P is normalized to provide value s, block 210. In at least one embodiment this is mathematically represented as:

$$s = \sqrt{\sum_{i=1}^{k} p_i^2}$$

Continuing with the present example, based on the above value of P the value of s is returned as: s=9.79796. With the resulting value of s, the sketch vector N is now determined as: $N=[p_1/s, p_2/s, \ldots p_k/s]$, block 212. Based on the present example the value of N is found to be:

$$N=P/s=(-0.204, -0.204, 0, 0.204, -0.204, -0.408, -0.408, -0.204, 0, 0.204, -0.204, -0.612)$$

As each party desiring to participate in the comparison process is capable of generating his or her own vector P, value s and resulting sketch vector N, N may be advantageously generated internally and then shared publicly without breaching the anonymity of the members of set S.

Moreover, general set comparison protocols rely on cryptographic methods, and, as such, require the comparing parties to be involved throughout the comparison process as elaborate protocols are used to derive the degree of overlap which may or may not exist. These protocols typically require the involvement of the owners of the two sets every time there is a comparison to be made. In sharp contrast to this required continual involvement, the statistical method of creating sets advantageously frees the parties. Once the sketch is generated, it may be published for all to see and use, with no further involvement of the owner required.

Having achieved the determination of N, for the determination of similarity the above process is performed again for at least one additional set, such as set S', decision 214 and block 216 returning to block 208.

For ease of illustration and to further explanation, for the example herein the method is shown to incorporate the use of a random matrix and characteristic vectors. In the instance example, two additional sets 106, 108 are provided as S' and S'', their corresponding characteristic vectors shown above and in FIG. 4. Paralleling the above description, the values of P', s', N' and P'', s'' and N'' are shown to be the following:

$$RM \times C' = P' = (-3, 1, -1, -1, -1, -1, -1, -3, -3, 3, -3, -9)$$

$$s' = 11.4891$$

$$N' = (-0.261, 0.0870, -0.0870, -0.0870, -0.0870, -0.0870, -0.0870, -0.261, -0.261, 0.261, -0.261, -0.783)$$

$$RM \times C'' = P'' = (-3, -1, -3, 1, -1, 1, -5, -5, -1, -7, -9, -1)$$

$$s'' = 14.2829$$

$$N'' = (-0.210, -0.070, -0.210, 0.070, -0.070, 0.070, -0.350, -0.350, -0.070, -0.490, -0.630, -0.070)$$

With at least two sketches now known, i.e. N and N', the statistical similarity between the original sets 104 and 106 (S and S'), 104 and 108 (S and S''), and 106 and 108 (S' and S'') can be determined. There are at least two options for determining the statistical similarity, decision 218. In at least one embodiment, such an evaluation is performed by computing a metric of the distance between the sketch vectors, i.e. N and N', block 220. Distance may be defined as: dist(S,S')=1−sim(S,S'). It can be shown that the distance two sets S and S' can be estimated using the following formula:

$$dist(S, S') \approx \frac{(\|N - N'\|_2)^2}{2}$$

where the symbol ≈ denotes the act of estimating the left hand side based on the value of the right hand side.

In other words, the square of the Euclidian distance between N and N' is an estimator of the distance between S and S'. As a result, to find sets that are close to each other according to the distance metric above, application may be made of clustering, nearest neighbor or other algorithms that are known to work with Euclidian distance. As vectors that are the same will have a distance of zero, an evaluated distance value (decision 224) of about zero indicates a similarity between sets that is good (block 226) and a distance value of about 1 indicates a similarity that is bad (block 228).

With respect to our present example, the distance estimations are as follows:

$$dist(S,S') \approx 0.253797488$$

$$dist(S,S'') \approx 0.657001845$$

$$dist(S',S'') \approx 0.70749081$$

As is sets 104 and 106 share common elements, but do not with set 108, the distance estimation for dist(S,S') is closer to zero than are the estimation of dist(S,S'') or dist(S', S'').

In an alternative embodiment, the statistical similarity is determined by determining the cosine of the two vectors N and N', block 222. The cosine of two vectors is defined as:

$$\cos(N, N') = \frac{\sum_{i=1}^{k} N_i N_i'}{\sqrt{\sum_{i}^{k} N_i^2} \sqrt{\sum_{i}^{k} N_i'^2}}$$

More specifically, it can be shown that $\cos(N,N') \approx \sin(S,S')$. In other words, the cosine of N and N' can be used as an estimator for the degree of similarity between the sets S and S'.

Where the evaluation of cos(N,N') (decision 230) is about one, the similarity is evaluated as good, block 232. Where the evaluation of cos(N,N') (decision 230) is about zero, the similarity is evaluated as bad, block 234.

With respect to our present example, the cosine evaluations are as follows:

$$\cos(N,N') = 0.746203$$

$$\cos(N,N'') = 0.342997$$

$$\cos(N',N'') = 0.292509$$

As is sets 104 and 106 share common elements, but do not with set 108, the cosine value for cos(N,N') is closer to one than are the cosine values of cos(N,N'') or cos(N',N'').

It should be noted that when N and N' have been obtained by the normalization described above, the denominator is 1. Further, under this assumption, the cosine is:

$$\cos(N, N') = 1 - \frac{(\|N - N'\|_2)^2}{2}$$

It is to be understood and appreciated that the example universe and set comparison presented herein have been adopted for ease of illustration and discussion. Despite relatively small values for the universe and the respective sets, the statistical predictions do evidence the condition of overlap between N and N', i.e. set 104 and set 106. Where the universe is larger and k is larger the resulting sketches and computed estimates are even more accurate when the two sets overlap.

Moreover, with respect to both the similarity and distance estimations, the accuracy of the estimation depends on the size of the sketch, variable k. The larger k, the more accurate the estimation. There is also another factor in the accuracy of the estimation: the degree of similarity itself. It can be shown that the estimates of similarity and distance given above become more and more accurate as sim(S,S') gets closer to one. When the two sets are identical, the estimators are almost exact. On the other hand, if sim(S,S') is low, the accuracy of the estimation is very low. Specifically, when sim(S,S') is close to zero, the estimate is also so low that it provides little information about the actual overlap between the two sets. This is advantageously important because it thwarts an enumeration attack on the privacy of the sketch.

More specifically, as all parties have access to the universe, an opponent might try and guess the contents of a set by comparing it to all possible subsets of the universe. If the size of such a subset is small, such as with singleton sets, then the degree of similarity is close to zero, and the accuracy of the estimation is so low that the opponent learns essentially nothing about the actual set. If the opponent opts to try an enumeration attack with larger subsets of the universe, the opponent will face a combinatorial explosion. Specifically, for a number q, 0<q<w (where w is again the size of the universe), the number of possible subsets of size q is $\binom{w}{q}$, which grows very rapidly as q increases towards w/2. In other words, the accuracy of the estimate of similarity is low in situations typically exploited by enumeration attacks. Moreover, the statistical method for creating sketches of sets to permit comparing set members is advantageously enumeration attack resistant.

Even though the method is by its nature enumeration attack resistant, further security mechanisms can be added to prevent excessive numbers of queries within a fixed timeframe or from the same user. Such mechanisms, known to those trained in the state of the art, provide further protection against enumeration attacks.

In at least one embodiment, the statistical method for creating sketches of sets to permit comparing set members is implemented as a computer program. Moreover, in at least one embodiment, provided is a computer readable medium on which is stored a computer program for creating sketches of sets to permit comparing set members. The form of this medium and the language of the program are understood to be appropriate to the type of computer employed, such as magnetic disks, optical disks, and memory.

Memory bus 518 couples main memory 512 to CPU 510. A system bus 506 couples hard drive 514, CD-ROM/DVD drive 516, and connection ports 508 to CPU 510. Multiple input devices may be provided, such as a mouse 520 and keyboard 522. Multiple output devices may also be provided, such as a video monitor 524 and a printer (not shown).

Computer system 500 may be a commercially available system, such as a desktop workstation unit provided by HP, or other computer system provider. Computer system 500 may also be a networked computer system, wherein memory storage components such as hard drive 514, additional CPUs 510 and output devices such as printers are provided by physically separate computer systems commonly tied together in the network. Those skilled in the art will understand and appreciate that physical composition of components and component interconnections comprising computer system 500, and select a computer system 500 suitable for the schedules to be established and maintained.

When computer system 500 is activated, preferably an operating system 526 will load into main memory 512 as part of the boot strap startup sequence and ready the computer system 500 for operation. At the simplest level, and in the most general sense, the tasks of an operating system fall into specific categories—process management, device management (including application and user interface management) and memory management.

In such a computer system 500, the CPU 510 is operable to perform one or more of the embodiments described above for creating sketches of sets to permit comparing set members. Those skilled in the art will understand that a computer-readable medium 528 on which is a computer program 530 for adding activities to a schedule may be provided to the computer system 500. The form of the medium 528 and language of the program 530 are understood to be appropriate for computer system 500. Utilizing the memory stores, such as one or more hard drives 514 and main system memory 512, the operable CPU 510 will read the instructions provided by the computer program 530 and operate to perform the method(s) for creating sketches of sets to permit comparing set members as described above. Moreover, computer system 500 is a computing device configured to perform a method for creating sketches of sets to permit comparing set members selected from a universe.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method for creating sketches of sets to permit comparing set members selected from a universe U with a size w, comprising:
    selecting a size k for a sketch N;
    providing a randomizer;
    providing set S as a subset of U;
    processing the set S by the randomizer to provide vector P;
    normalize vector P to provide a number s;
    determining sketch N by dividing each element of P by s; sketch N when compared with at least one sketch N' permitting a user to compare a degree of similarity between the members of set S to at least one set S'.

2. The method of claim 1, wherein the randomizer is a random matrix, and wherein processing the set S further includes generating a characteristic vector C of size w from set S, the characteristic vector C processed by the random matrix to provide vector P.

3. The method of claim 2, wherein the random matrix consists of a repeated instantiations of a random variable with an expected value of zero.

4. The method of claim 1, wherein the randomizer is a set of hash functions $h_1, \ldots h_k$, vector P is determined by computing for each element of vector P:

$$p_i = \sum_{x \in S} h_i(m(x)),$$

wherein m(x) is a function mapping the elements of the universe to integers in the range from 1 to w.

5. The method of claim 1, wherein s is determining by computing:

$$s = \sqrt{\sum_{i=1}^{k} p_i^2}, p_i$$

representing each element of vector P.

6. The method of claim 5, wherein the sketch N is a vector $[p_1/s, p_2/s, \ldots p_k/s]$.

7. The method of claim 1, wherein the method is performed for set S to provide sketch N and for set S' to provide sketch N', the randomizer remaining unchanged.

8. The method of claim 7, further including evaluating N and N' to determine an assessment of the degree of similarity between S and S'.

9. The method of claim 8, wherein the evaluation is performed by computing a measure of the degree of similarity.

10. The method of claim 9, wherein the evaluation is performed by taking the cosine of vectors N and N'.

11. The method of claim 10, wherein for a cosine value of about 1 the degree of similarity is evaluated as good and for a cosine value of about 0 the degree of similarity is evaluated as bad.

12. The method of claim 8, wherein the evaluation is performed by determining a measure of distance between N and N'.

13. The method of claim 12, wherein the evaluation of the degree of similarity based on distance is computed by:

$$dist(S, S') \approx \frac{(\|N - N'\|_2)^2}{2}.$$

14. The method of claim 12, wherein the degree of similarity is evaluated as good or bad depending on the distance value.

15. The method of claim 8, wherein the evaluation is performed without divulging the members of S or S'.

16. The method of claim 8, wherein the method is enumeration attack resistant.

17. A method for creating sketches of sets to permit comparing set members selected from a universe U with a size w, comprising:
    selecting a size k for a sketch;
    providing a randomizer;
    providing a first set S1 as a subset of U;
    processing set S1 by the randomizer to provide vector P1;
    normalize vector P1 to provide s1;
    determining sketch N1 by dividing each element of P1 by s1;
    providing a second set S2 as a subset of U;
    processing set S2 by the randomizer to provide vector P2;
    normalize vector P2 to provide s2;
    determining sketch N2 by dividing each element of P2 by s2;
    evaluating N1 and N2 to determine the degree of similarity between S1 and S2; and
    outputting the evaluation of a degree of similarity to a user.

18. The method of claim 17, wherein the evaluation is performed without divulging the members of S or S'.

19. A computer-readable medium on which is stored a computer program for a method for creating sketches of sets to permit comparing set members selected from a universe U with a size w, the computer program comprising instructions which, when executed by a computer perform the steps of:
    selecting a size k for a sketch N;
    providing a randomizer;
    providing set S as a subset of U;
    processing set S by the randomizer to provide vector P;
    normalize vector P to provide a number s; and
    determining sketch N by dividing each element of P by s, sketch N when compared with at least one sketch N' permitting a user to compare a degree of similarity between the members of set S to at least one set S'.

20. The computer readable medium of claim 19, wherein the randomizer is selected from the set consisting of a hash function and a random matrix of size w by k.

21. The computer readable medium of claim 19, wherein the method is performed for set S to provide sketch N and for set S' to provide sketch N', the randomizer remaining unchanged.

22. The computer readable medium of claim 21, further including evaluating N and N' to determine an assessment of the degree of similarity between S and S'.

23. The computer readable medium of claim 22, wherein the evaluation is performed without divulging the members of S or S'.

* * * * *